United States Patent [19]

Nakajima et al.

[11] 4,283,601
[45] Aug. 11, 1981

[54] PREPROCESSING METHOD AND DEVICE FOR SPEECH RECOGNITION DEVICE

[75] Inventors: Akira Nakajima, Hachioji; Akira Ichikawa, Kokubunji; Kazuo Nakata, Kodaira, all of Japan

[73] Assignee: Hitachi, Ltd., Tokyo, Japan

[21] Appl. No.: 37,026

[22] Filed: May 8, 1979

[30] Foreign Application Priority Data

May 12, 1978 [JP] Japan .................................. 53-55556

[51] Int. Cl.$^3$ .............................................. G10L 1/00
[52] U.S. Cl. .................................. 179/1 SD; 179/1 P
[58] Field of Search ............... 179/1 SD, 1 SC, 1 D, 179/15.55 R, 1 P; 364/724, 725, 726

[56] References Cited

U.S. PATENT DOCUMENTS

| 4,032,710 | 6/1977 | Martin et al. | 179/1 SC |
| 4,100,370 | 7/1978 | Suzuki et al. | 179/1 SD |

OTHER PUBLICATIONS

N. Dixon, et al., "Small-Vocabulary, Discrete-Word Recognizer etc.", IBM Tech. Disc. Bull., Apr. 1977, pp. 4483-4484.

G. White, et al., "Speech Recognition Experiments etc.", IEEE Trans. on Acoustics, Speech and S.P., Apr. 1976, pp. 183-188.

*Primary Examiner*—Mark E. Nusbaum
*Assistant Examiner*—E. S. Kemeny
*Attorney, Agent, or Firm*—Craig and Antonelli

[57] ABSTRACT

Signal-to-noise is enhanced by including the upper sideband of a sampled-speech signal with the original baseband signal for further signal processing. The invention features shifting both bands to form a continuum from 0 Hz to the sampling frequency. Application in a speech recognition is shown.

6 Claims, 16 Drawing Figures

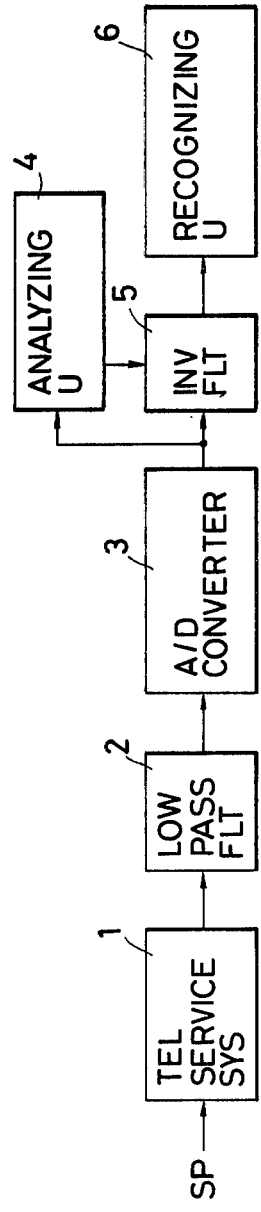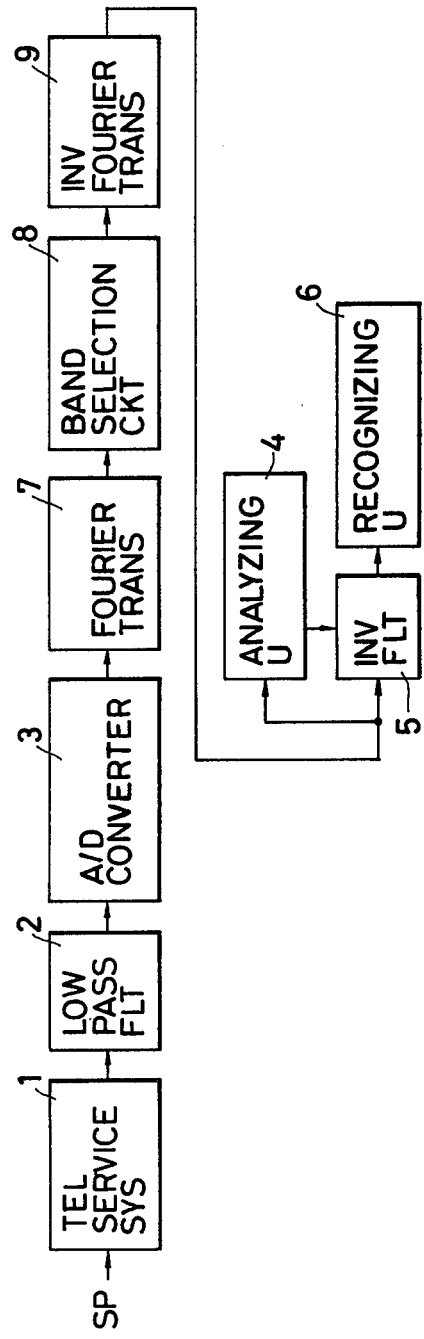

5 kHz 0.3 kHz  3.4 kHz 0.3 kHz  3.4 kHz 3.4 kHz  fc fs fs

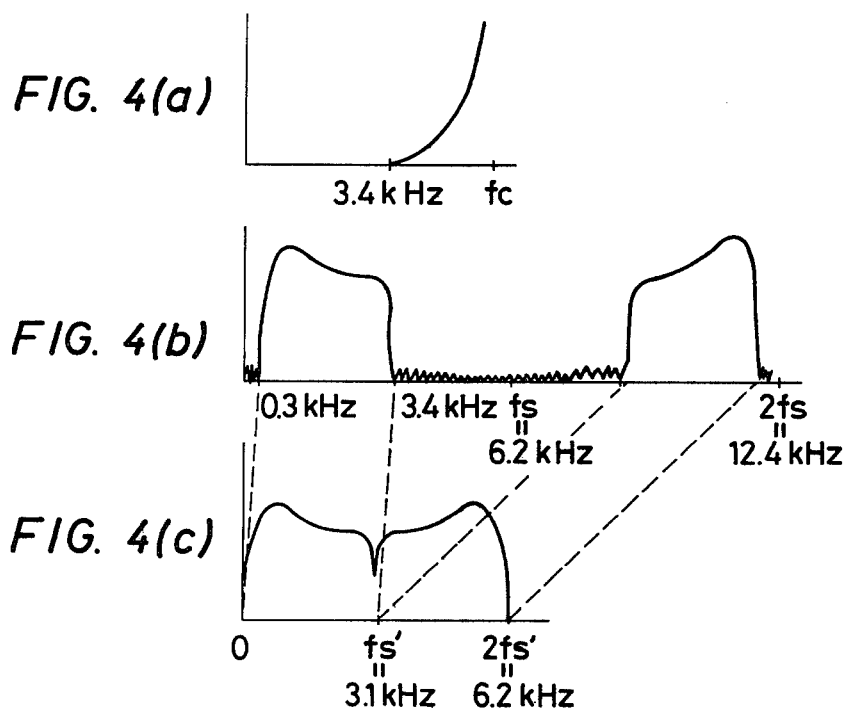

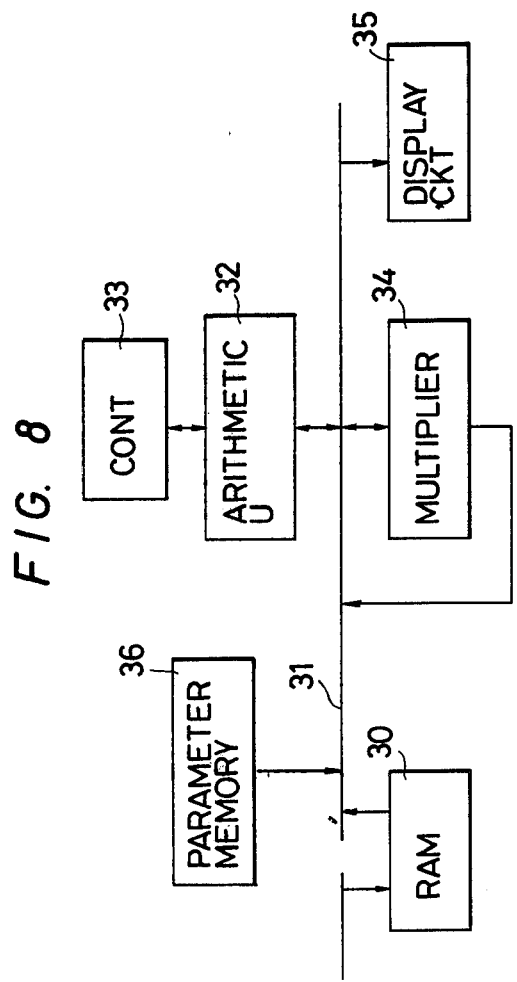

PREPROCESSING METHOD AND DEVICE FOR SPEECH RECOGNITION DEVICE

BACKGROUND OF THE INVENTION

This invention relates to a preprocessing method and device for speech recognition. More particularly, it relates to a preprocessing method and device for recognizing speech which is received through a transmission system, such as a telephone line network.

In an information service system which connects a telephone line network to an information service center, including a computer system, and a telephone line network, speech from an ARU (audio response unit) is employed as an output from the information service center, while a push-button signal is employed or voice is directly used as an input from a speaker to the telephone line network. The input speech from the speaker is transmitted to the information service center via the telephone line network. In the information service center, speech recognition is performed by investigating the similarity between the input speech and a standard speech signal.

The input speech having passed through the network in this manner is distorted under the influence of the transmission characteristic of the transmission system. On the other hand, the distortion characteristic of the network is not uniform, but it usually differs depending upon the various routes the information takes through the transmission system. In the speech recognition device, accordingly, input speech received from circuits having different distortion characteristics are typically compared. It is therefore necessary to eliminate the influence of the distortion or to reduce it by normalization or other means if accurate speech recognition is to be obtained.

As a method for correcting the distortion of the spectrum of the input speech dependent upon the transmission circuit to components for the problems described above, a method disclosed in U.S. patent application Ser. No. 880,951, filed by the same inventor as in the present application, has been proposed.

In this method, a predetermined section of input speech is analyzed to extract a spectrum of information in the section, and an inverse filter which has a characteristic inverse to the spectrum is provided. The input speech is then passed through the inverse filter so as to cancel the influence of the transmission characteristic of the transmission circuit on the input speech. With such a prior-art method, however, the inverse filter becomes very astable and inferiorly follows the characteristic within the speech transmission band. Another disadvantage is that it is susceptible to noise outside the speech transmission band.

SUMMARY OF THE INVENTION

An object of this invention is provide a preprocessing method and system for a speech recognition device in which the stability of an inverse filter is enhanced, the degradation of speech information within a transmission band is prevented and the influence of noise outside the transmission band is eliminated.

In order to accomplish such an object, this invention is characterized by providing a preprocessing method for a speech recognition device comprising the first step of Fourier-transforming a speech signal from an input means to obtain a frequency spectrum, the second step of exctracting only those parts of the frequency spectrum which relate to the frequency spectrum of the transmission band of the transmission system from the frequency spectrum obtained during the first step and continuously rearranging the extracted frequency spectrum within a frequency band starting from 0 Hz, the third step of subjecting to inverse Fourier transform a signal corresponding to the frequency spectrum rearranged during the second step, the fourth step of analyzing a signal obtained at the third step to obtain a specified characteristic parameter and the fifth step of setting a characteristic inverse to the characteristic parameter obtained by the fourth step in an inverse filter and passing the input speech signal through the inverse filter, speech which has been received via a transmission system, sampled and then digitized is Fourier-transformed to obtain a frequency spectrum; in the spectrum, only a component within a band of the transmission system and a folded component due to the sampling are taken out as a continuous frequency band beginning from 0 KHz; using the frequency band as a new spectrum, an inverse Fourier transform is executed; and the transformed result is used as the characteristic of an inverse filter.

BRIEF DESCRIPTION OF THE DRAWINGS

FIG. 1 is a block diagram of a prior-art speech recognition device,

FIG. 3 is a block diagram of an embodiment of a speech recognition device which operates in accordance with the preprocessing method according to this invention, FIGS. 4(a) to 4(c) are diagrams showing spectra and characteristics of parts in FIG. 3.

DETAILED DESCRIPTION OF THE PRIOR ART

Figure 2A:
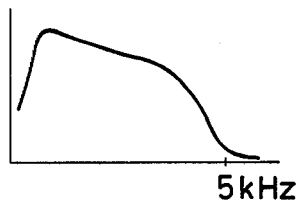
FIGS. 2(a) to 2(g) are diagrams showing spectra and characteristics of various parts in FIG. 1.

FIG. 1 shows the construction of a speech recognition device for performing a prior-art preprocessing method, while FIGS. 2(a) to 2(g) show spectral and transmission characteristics of various points of the device illustrated in FIG. 1.

Referring to FIG. 1, a speech signal SP passes through a telephone line 1 having a certain transmission characteristic, whereupon it passes through a low-pass filter 2 for preventing folded noise due to sampling. The filtered speech signal is sampled at a predetermined frequency and converted into a digital signal by an analog-to-digital converter 3 (hereinbelow, termed "A/D converter"). A characteristic parameter in a predetermined boundary or section is obtained from the digital-converted speech in an analyzing unit 4, and the output thereof is applied to an inverse filter 5. By passing the input speech signal through the inverse filter 5, a speech signal with the discrepancy of the characteristic of the telephone line 1 canceled is applied to a recognizing unit 6. In the recognizing unit 6, the speech recognition is effected by comparing the speech signal thus obtained and a standard speech signal and evaluating the similarity between them.

Figure 2B:
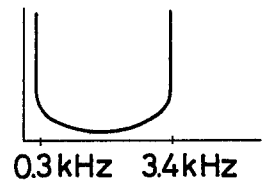
Figure 2C:
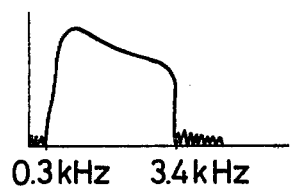

FIG. 2(a) simulates the mean spectrum of the speech before it is passed through the telephone line 1, and FIG. 2(b) shows the transmission characteristic of the telephone line 1. As seen from FIG. 2(b), the transmission characteristic of the telephone line 1 has a band width of 0.3 KHz–3.4 KHz. Therefore, the mean spectrum of the speech having passed through the telephone line 1 undergoes a band limitation with an abrupt characteristic as illustrated in FIG. 2(c), and noise is included outside the band at the upper and lower ends thereof.

Figure 2D:
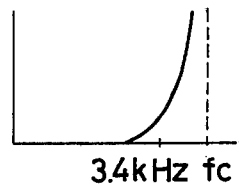

When the low-pass filter 2 for preventing the folded noise due to the sampling is designed with a very abrupt cut-off characteristic, subsequent of the speech signals are adversely affected. For this reason, there is usually provided a filter which, as illustrated in FIG. 2(d), begins to decay at a frequency somewhat lower than 3.4 KHz, which is the upper limit of the telephone transmission band, and has a cut-off frequency $f_c$ at 4–5 KHz (for example, 4.2 KHz). Through such a low-pass filter 2, noise components at and above the cut-off frequency $f_c$ are mostly removed. However, information in the speech band which is not higher than 3.4 KHz is also lost to some extent, resulting in occurrence of some degradation of information.

Figure 2E:
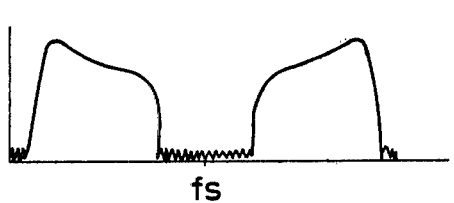
Figure 2F:
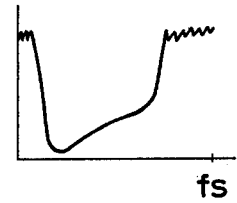

In the A/D converter 3, the sampling is ordinarily carried out at a sampling frequency of 8–10 KHz. Therefore, as shown in FIG. 2(e), the mean power spectrum of the digital signal obtained with the A/D converter 3 has a line symmetry with the center at a frequency $f_s$, which is half of the sampling frequency and extends to the sampling frequency. This output of the A/D converter 3 is subjected to a spectral analysis in the analyzing unit 4, and the inverse characteristic of the analyzed spectrum is set in the inverse filter 5. Thus, the transmission characteristic of the inverse filter 5 becomes that shown in FIG. 2(f).

In the case where, in this manner, speech having a spectrum as shown in FIG. 2(e) is analyzed by the analyzing unit 4 and the characteristic of the inverse filter 5 is set with the result of this analyzing operation, the spectrum shown in FIG. 2(e) falls abruptly at the upper limit and lower limit of the band of the telephone line, and these abrupt characteristics are included within the band to be analyzed by the analyzing unit 4, i.e., within the frequencies $0-f_s$. Accordingly, the inverse filter in which the inverse characteristic of the spectrum of the analyzed result is set is prone to become astable at those parts which follow the abrupt characteristics of the upper-limit and lower-limit parts of the telephone transmission band. Another problem which also typically occurs is that the following of the characteristic within the telephone transmission band becomes inferior.

Figure 2G:
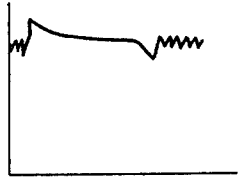

As illustrated in FIG. 2(g), although the influence of the telephone line on the mean spectrum of the speech which has passed through the inverse filter is normalized and becomes flat inside the band, the noise components thereof are amplified into great values outside the band. This is because a small part of the spectrum of the input speech is conversely emphasized in the inverse filter.

DETAILED DESCRIPTION OF THE PREFERRED EMBODIMENTS

The expression "speech recognition" as used in describing this invention is the general term typically used to describe recognition, measurement etc. of speech waveform information, such as word recognition, speaker recognition and speaker identification.

FIG. 3 shows an embodiment of a speech recognition device for realizing a preprocessing method according to this invention, while FIGS. 4(a) to 4(c) show spectra and characteristics for explaining operations of various parts of the device illustrated in FIG. 3. Those elements commonly used in the prior art circuit of FIG. 1 are given the same reference numeral designations in FIG. 3.

Referring to FIG. 3, a fast Fourier transformer 7 is connected to the output of A/D converter 3, and a band selection circuit 8 connects the Fourier transformer 7 to a fast inverse Fourier transformer 9 whose output is applied in common to analyzing unit 4 and inverse filter 5.

As illustrated in FIG. 4(a), the cut-off frequency $f_c$ of the low-pass filter 2 is set (a) so as to be sufficiently high that the speech which falls below the upper limit 3.4 KHz of the telephone transmission band is not affected by the filter and (b) to be lower than the frequency $f_s$, which is half of the sampling frequency. Accordingly, the frequency $f_s$ must be higher than 3.4 KHz, which is the upper limit of the telephone transmission band.

With such a construction, the speech SP passes via the telephone line 1, having the characteristic as shown in FIG. 2(b), through the low-pass filter 2 having the attenuation characteristic as shown in FIG. 4(a) in which the decay begins at a frequency higher than the upper limit of the telephone transmission band and in which the cut-off frequency $f_c$ is sufficiently high, and thereafter, it is applied to the A/D converter 3. Then, it is sampled at the sampling frequency stipulated as stated above and is converted into a digital signal of predetermined bits.

Regarding the converted output, the whole speech to be analyzed is collectively Fourier-transformed by the fast Fourier transformer 7, and a spectral characteristic as shown in FIG. 4(b) is obtained. In the band selection circuit 8, only the telephone transmission band of 0.3–3.4 KHz, and the band of the folded component due to the sampling is taken out from the spectrum shown in FIG. 4(b). Thus, a spectrum which is rearranged from 0 Hz as shown in FIG. 4(c) is obtained.

The fast Fourier transformer 7 is typically designed to transform speech data of powers of "2". Therefore, when the speech data to be applied is not of powers of "2", it is favorable to insert "0" behind the data and to put the data as a whole into powers of "2". It is also convenient that the number of data of the inverse Fourier transformer 9 is of powers of "2". By way of example, as seen from FIG. 4(c), the equivalent sampling frequency of the selected spectrum or $2 \times f_s'$ becomes 6.2 KHz, which is double the telephone transmission band width 3.1 KHz (=3.4 KHz–0.3 KHz). Therefore, when 12.4 KHz, which is twice as high as the equivalent sampling frequency, is made the sampling frequency $2 \cdot f_s$ of the A/D converter 3, the frequency $f_s$ equal to half thereof becomes 6.2 KHz. This also fulfills the condition that the frequency $f_s$ is higher than the upper limit 3.4 KHz of the telephone transmission band. Accordingly, if the number of data of the spectrum representing up to the frequency $2 \cdot f_s'$ is a value of powers of "2", the number of data of the spectrum representing up to the frequency $2 \cdot f_s$ also becomes a power of "2" from the relationship $2 f_s = 2 (2 f_s')$, and this is favorable.

Usually, the sample value of the speech waveform is several hundred. By selecting the value to be a power of "2", therefore, 2 $f_s'$ and 2 $f_s$ automatically become powers of "2".

Although, in the above example, 2 $f_s$ is set at double of 2 $f_s'$, this ratio can in general be set at $2^n$ times ($n \geq 2$) of 2 $f_s'$. In this case, however, the sampling frequency becomes high, and the capacity of the data memory increases to that extent. When it is also taken into account that the processing quantity of the fast Fourier transformer also increases as the ratio of $2 \cdot f_s$ to $2 \cdot f_s'$, it is seen that the settings of the ratio at the double value, which is the required minimum, is most desirable. That is, when the telephone transmission band extends from a frequency $f_1$ to a frequency $f_2$, it is favorable to select the least n (n = 1, 2, ...) satisfying the relation of $(f_2 - f_1) \times 2^{n+1} \geq f_2 \times 2$ and to perform the sampling at $(f_2 - f_1) \times 2^{n+1}$.

As understood by comparing FIGS. 4(c) and 4(b), the frequency spectrum (FIG. 4(c)) which is applied to the inverse Fourier transformer 9 includes no component outside the speech band. Therefore, the abrupt characteristics of the band cut-off and the noise components outside the band are not existent in the band to be analyzed in the analyzing unit 4, that is, the band 0–$f_s'$. As a result, the abrupt characteristics which are factors of instability are not applied to the inverse filter 5, so that an inverse filter which is stable and which accurately follows the transmission characteristic inside the band can be realized. Simultaneously therewith, the speech information within the band is not degraded, and the noise outside the band can be perfectly eliminated.

As stated above, the half $f_s$ of the sampling frequency can be set at a high frequency, for example, 6.2 KHz. Therefore, the attenuation characteristic of the low-pass filter 2 can be set so as to rise at a value higher than the upper limit 3.4 KHz of the telephone transmission band, and the speech information inside the band is not degraded in this part of the system.

Further, the equivalent sampling frequency $2 \cdot f_s'$ of the converted waveform to be applied to the inverse filter becomes 6.2 KHz, which is a very low value as compared with the sampling frequency of 8–10 KHz found in the prior art system. Therefore, the number of processing steps performed in the analyzing unit 4, the inverse filter 5 and the recognizing unit 6 are reduced, and the processing speeds thereof are enhanced to that extent. Even when it is taken into account that the processing in the fast Fourier transformer 7, the band selection circuit 8 and the inverse Fourier transformer 9 increase, this invention still provides rather distinct advantages over the prior art as a whole.

Figure 5:
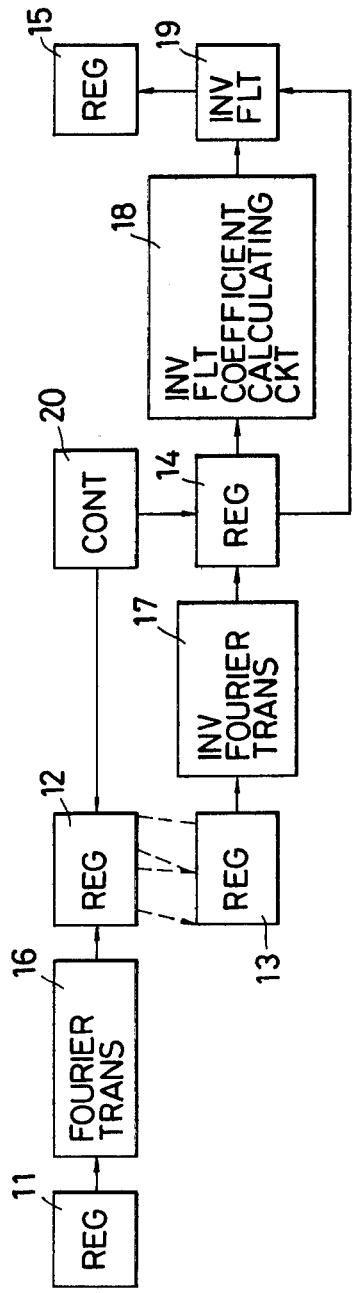
FIG. 5 is a block diagram showing a specific example of a preprocessing portion of the system illustrated in FIG. 3.

FIG. 5 shows the construction of an embodiment of a preprocessing portion of the device illustrated in FIG. 3. The illustrated portion corresponds to the fast Fourier transformer 7, the band selection circuit 8, the inverse Fourier transformer 9, the analyzing unit 4 and the inverse filter 5 in FIG. 3.

Referring to FIG. 5, numerals 11–15 designate respective registers, numeral 16 designates a Fourier transformer, numeral 17 designates an inverse Fourier transformer, numeral 18 designates an inverse filter coefficient calculating circuit, numeral 19 designates an inverse filter, and numeral 20 designates a controller.

With such a construction, the digital speech waveform from the A/D converter 3 in FIG. 3 is stored in the register 11. The speech waveform stored in the register 11 is applied to the Fourier transformer 16, data of the minimum number of powers of "2" that is not smaller than the number of data of the input speech waveform is Fouriertransformed, and the result is applied to the register 12. Accordingly, the spectral information as shown in FIG. 4(b) is stored in the register 12. In response to a control signal from the controller 20, the spectrum of the telephone transmission band 0.3–3.4 KHz and the band of the folded component within the register 12 is taken out, and the spectrum in the state in which the bands are compressed as shown in FIG. 4(c) is stored in the register 13. Subsequently, in the inverse Fourier transformer 17, inverse Fourier transforms in the number equal to half of the number of Fourier transforms performed in the Fourier transformer 16 are executed, and the results are applied to the register 14. Upon receipt of a control signal from the controller 20, predetermined lengths of speech data are sequentially taken out from the register 14 with shifts of fixed intervals, and these sampled data portions are subjected to a spectral analysis to evaluate a predetermined parameter, for example, a partial auto-correlation coefficient. The coefficient is applied to the inverse filter 19 to set the characteristic thereof. Further, upon receipt of the control signal from the controller 20, the speech data in the register 14 is sequentially passed through the inverse filter 19 and subjected to an inverse filtering, the result of which is stored in the register 15.

Figure 6:
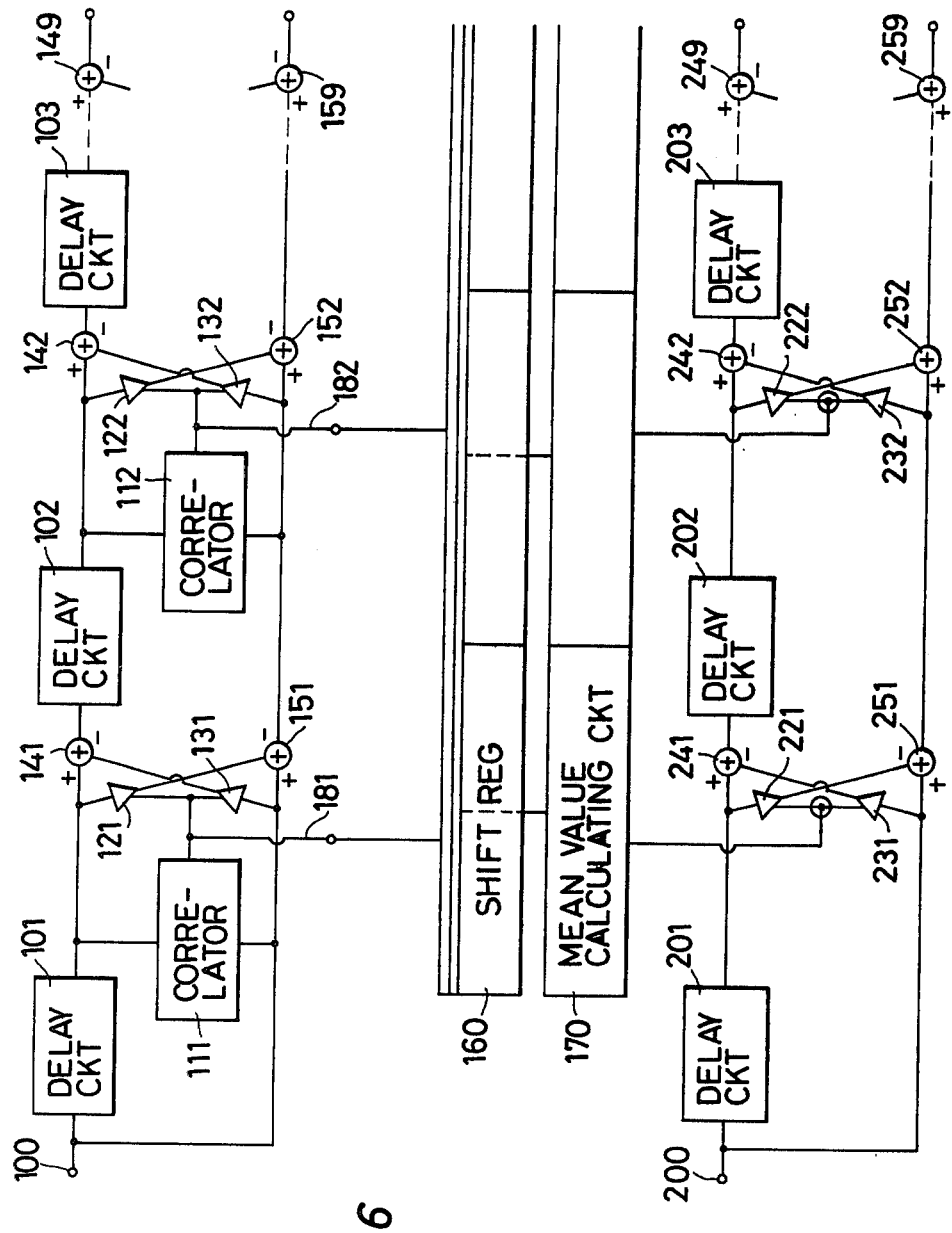
FIG. 6 is a block diagram showing a specific example of a portion of the system illustrated in FIG. 5, and FIGS. 7 and 8 are block diagrams each showing an example of a recognizing unit of the type illustrated in FIG. 3.

FIG. 6 shows a specific example of the part of the circuit illustrated in FIG. 5 comprising the inverse filter coefficient calculating circuit 18 and the inverse filter 19. In the example, the partial auto-correlation coefficient is evaluated by exploiting the well-known PARCOR analyzing technique (disclosed in, for example, Japanese patent application, published No. 18007/74), and the characteristic of the inverse filter is set with the coefficient.

Referring to FIG. 6, numerals 100 and 200 designate input terminals, numerals 101–103 and 201–203 designate delay circuits, numerals 111 and 112 designate correlators, numerals 121, 122, 131, 132, 221, 231 and 232 designate multipliers, numerals 141–14P, 151–15P, 241–24P and 251–25P designate adders, numeral 160 designates a shift register, and numeral 170 designates a mean value calculating circuit.

In FIG. 6, the speech signal to be analyzed is received from the terminal 100 and is applied to the delay circuit 101. The speech signal at terminal 100 is also applied the correlator 111, the multiplier 131 and the adder 151. The delayed signal at the output of the delay circuit 101 is applied to the correlator 111, the multiplier 121 and the adder 141. The correlator 111 is a known device which has the function of evaluating the correlation between the two input signals. An output of this device is provided as a first-order partial auto-correlation coefficient 181 (PARCO coefficient), and is also used as one input of each of the multipliers 121 and 131. The partial auto-correlation coefficient 181 is accumulated in the shift register 160. The outputs of the multipliers 121 and 131, which are first-order forward and backward prediction values, respectively, are applied to the adders 151 and 141 to determine the differences of these signals from the speech signal at the input terminal 100 and from the output of the delay circuit 101, respectively. As a result, the first-order forward and backward prediction signal differences are obtained and become inputs to the correlator 112 and the delay circuit 102, respectively. Thereafter, in the same manner, partial auto-correlation coefficients 182–18P of the second to P-th orders and a forward prediction error of the P-th order are analyzed and extracted. Since the speech data is received at the terminal 100 in a succession of sampling intervals, the partial auto-correlation coefficients 181–18P are calculated every moment and stored in the shift register 160. When the period of the register shift of the shift register 160 is made equal to the interval of the sampling, the partial auto-correlation coefficients of the speech as a whole are stored in the shift register 160 at the respective orders at the time of completion of the whole speech. The mean value calculating circuit 170 takes the averages of the partial auto-correlation coefficients of the respective orders after the completion of the analysis of the whole speech. The average values are set in the inverse filter as the partial auto-correlation coefficients of the particular orders, and they are held while the inverse filtering operation is being conducted.

The inverse filter has the same structure as that of a spectrum analyzing portion, i.e., the PARCOR analyzing filter in the inverse filter coefficient calculating circuit, but it differs only in that the partial auto-correlation coefficients evaluated in the spectrum analyzing portion are set in advance. It becomes a filter which has the inverse characteristic to the entire average spectrum of the analyzed speech. Speech data in the register 14 as received from the input terminal 200 is filtered by the above inverse filter.

Figure 7:
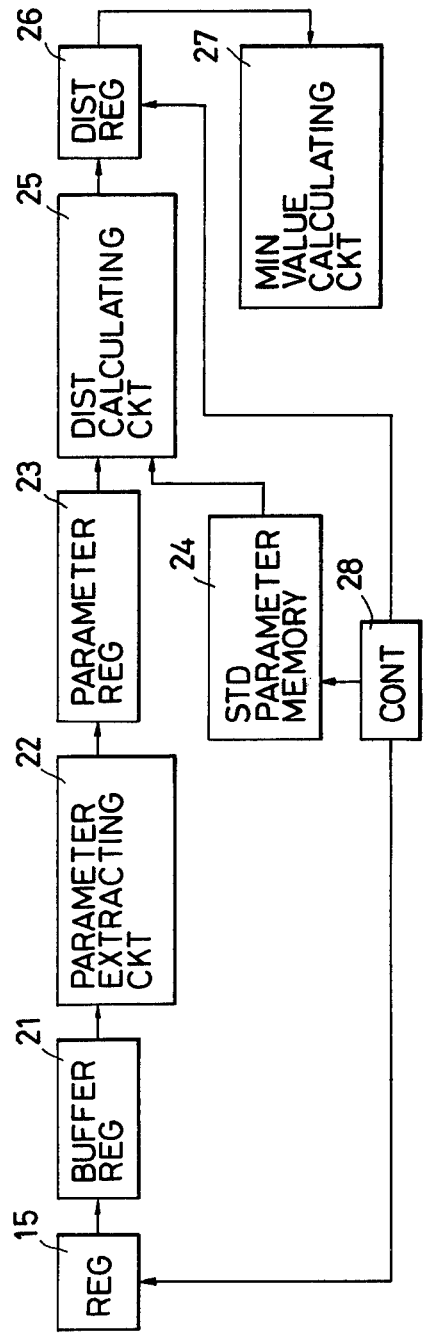

FIG. 7 shows a specific example of the recognizing unit 6 in FIG. 3. Numeral 15 designates a register corresponding to that similarly identified in FIG. 6, numeral 21 designates a buffer register, numeral 22 designates a parameter extracting circuit, numeral 23 designates a parameter register, numeral 24 designates a standard parameter memory, numeral 25 designates a distance calculating circuit, numeral 26 designates a distance register, numeral 27 designates a minimum value calculating circuit, and numeral 28 designates a controller.

In such a construction, the speech data having passed through the inverse filter is stored in the register 15. Upon receipt of a control signal from the controller 28, fixed lengths of the speech data are sequentially taken out at fixed intervals, and they are sent to the parameter extracting circuit 22 via the buffer register 21. This parameter extracting circuit 22 extracts a parameter necessary for the recognition. By way of example, an analyzing unit such as disclosed in the aforecited Japanese patent application, published No. 18007/74, can be used, and the partial auto-correlation coefficient is extracted as the parameter and is applied to the parameter register 23.

On the other hand, sets of parameters previously calculated and registered (in case of word recognition, parameter time series of respective words, and in case of speaker recognition, parameter time series of respective speakers) are stored in the standard parameter memory 24. Upon receipt of a control signal from the controller 28, the stored contents are successively taken out and applied to the distance calculating circuit 25. In the distance calculating circuit 25, the characteristic parameter provided from the parameter register 23 and the standard parameter from the standard parameter memory 24 are compared, and the similarity between them, i.e., the distance is calculated. The result is sent to the distance register 26. As the distance calculating circuit 25, there can be utilized, for example, a circuit of the type disclosed in Japanese patent application, laid-open No. 30242/72. When the distances from all the standard parameters have been calculated, all the distances in the distance register 26 are applied to the minimum value calculating circuit 27 in response to receipt of a signal from the controller 28 so as to obtain the minimum value of the distances. A category representative of the standard parameter indicating the minimum value is provided as an output. The controllers 20 and 28 in FIGS. 5 and 7 can be constructed by employing well-known sequencers etc.

FIG. 8 shows another example of the recognizing unit 6 in FIG. 3. The example uses a microcomputer.

Referring to FIG. 8, numeral 30 indicates a random access memory which stores therein the speech data from the preprocessing device, numeral 31 designates a data bus, numeral 32 designates an arithmetic unit, numeral 33 designates a controller which is made of a sequencer, a micro-instruction memory or the like, numeral 34 designates a multiplier, numeral 35 designates a result display circuit, and numeral 36 designates a parameter memory for standard speeches.

Hereunder, description will be made of a recognition processing method which is executed with the microcomputer of such a construction.

It is well known that, in the case of analyzing speeches with the foregoing PARCOR technique and assessing the similarity between the speeches, various sorts of parameters are obtained from the auto-correlation coefficients of waveforms. Accordingly, the foregoing partial auto-correlation coefficient k and a linear prediction coefficient $\alpha$ can be evaluated from the auto-correlation coefficient $\rho$.

It is also well known that the assessment of the similarity of the spectra of waveforms expressed by the linear prediction coefficient $\alpha$ or the partial auto-correlation coefficient k is obtained from the auto-correlation coefficient $\rho$ and the linear prediction coefficient $\alpha$.

With such a procedure, the processing of the inverse filter can also be realized as stated below.

Now, the auto-correlation coefficient $\rho_v$ over the whole speech N of a speech waveform $x_i$ stored in the random access memory 30 is denoted by the following equation (1):

$$\rho_\tau = \frac{\sum_{i=1}^{N-IP} x_i \cdot x_{i+\tau}}{\sum_{i=1}^{N-IP} x_i^2} \tag{1}$$

where IP denotes the order of the inverse filter, and $\tau$ the order of the auto-correlation coefficient.

From this equation, the linear prediction coefficient $\alpha$ representative of the whole spectrum is evaluated by solving simultaneous linear equations given by the following equation (2) with a well-known procedure:

$$\begin{bmatrix} \rho_0 & \rho_1 & \cdots & \rho_{IP-1} \\ \rho_1 & \rho_0 & \cdots & \rho_{IP+2} \\ \vdots & & \ddots & \vdots \\ \rho_{IP-1} & \cdots & & \rho_0 \end{bmatrix} \begin{bmatrix} \alpha_1 \\ \alpha_2 \\ \vdots \\ \alpha_{IP} \end{bmatrix} = \begin{bmatrix} \rho_1 \\ \rho_2 \\ \vdots \\ \rho_{IP} \end{bmatrix} \tag{2}$$

The inverse spectral parameter $A_j$ is defined as in the following equation (3):

$$A_j = \sum_{i=0}^{IP-j} \alpha_i \alpha_{i+j} \tag{3}$$

On the other hand, as to a case where every M samples (1 frame) are taken out while shifting the speech waveforms in the memory 30 every T seconds, the auto-correlation coefficient of that part is considered.

Letting $K_{\rho_T}$ denote the auto-correlation coefficient of M sample waveform values taken out at the K-th cycle (hereinbelow, termed "K-th frame"), the following equation (4) similar to the case of the foregoing whole speech is obtained:

$$K_{\rho_T} = \frac{\sum_{i=1}^{M-IP} X_{KT+i} \cdot X_{KT+i+\tau}}{\sum_{i=1}^{M-IP} X_{KT+i}^2} \quad (4)$$

When the following equation (5) is obtained from Equations (4) and (3), $K_{\gamma_T}$, representing the auto-correlation coefficient of the speech of the K-th frame which has passed through the inverse filter having the inverse characteristic of the spectrum of the whole speech, is obtained:

$$K_{\gamma_T} = A_0 K_{\rho_T} + \sum_{j=1}^{IP} A_j(K_{\rho_T-j} + K_{\rho_T+j}) \quad (5)$$

$K_\gamma$ of this equation (5) is the auto-correlation coefficient of the speech waveform having passed through the inverse filter. If the spectrum of the inverse filter and the spectrum of the input speech waveform are exactly of opposite polarity, the spectrum of the output waveform of the inverse filter becomes white (voiceless sound), and the auto-correlation coefficient $K_\gamma$ becomes a minimum. That is, by applying this method, the degree of coincidence between the spectra of two speech waveforms can be estimated. The method of estimation will be explained more specifically.

The auto-correlation coefficient of the first speech waveform of the two speech waveforms is denoted by $K_{\gamma(1)}$ and the auto-correlation coefficient of the second speech waveform is denoted by $K'_{\gamma(2)}$ (K of the first speech waveform and K of the second speech waveform agree in case of estimating them in a relation linear in time, but they do not agree in the dynamic programming (DP) matching etc. in which a nonlinear time base is taken). Likewise, the inverse spectrum coefficients obtained from them are denoted by $K_A(1)$ and $K'_A(2)$. Then, the similarity d between the K-th and K'-th frames of the two speech waveforms is expressed by the following equation (6):

$$d = \frac{\left(K_{A_0}^{(1)}K'_{\gamma_0}^{(2)} + 2\sum_{j=1}^{IP} K_{A_j}^{(1)}K'_{\gamma_j}^{(2)}\right)}{\left(K'_{A_0}^{(2)}K'_{\gamma_0}^{(2)} + 2\sum_{j=1}^{IP} K'_{A_j}^{(2)}K'_{\gamma_j}^{(2)}\right)} + \frac{\left(K'_{A_0}^{(2)}K'_{\gamma_0}^{(1)} + 2\sum_{j=1}^{IP} K'_{A_j}^{(2)}K_{\gamma_j}^{(1)}\right)}{\left(K_{A_0}^{(1)}\gamma_0^{(1)} + 2\sum_{j=1}^{IP} K'_{A_j}^{(1)}K_{\gamma_j}^{(1)}\right)} \quad (6)$$

As the value of d is smaller, the spectra of the two speech waveforms are more similar. When the spectra of the two speech waveforms agree perfectly, the respective denominators and numerators of the first and second terms of Equation (6) become equal, and d = 2. In general, both do not agree, and in the case of disagreement, the numerator becomes larger than the denominator, and the value of d becomes large.

It is understood that, in the case of employing the procedure described above, the inverse filter may well be obtained in the form of the auto-correlation coefficient without operating in the waveform region. In this case, a linear prediction coefficient (also called "regression coefficient") $K_\alpha$ which is a kind of linear prediction parameter is obtained in the course of the processing. It is needless to say that the value of the coefficient $K_\alpha$ needs to be sufficiently stable. Particularly, the result of indirectly passing the speech waveform through the inverse filter is obtained in the form of the auto-correlation coefficient $K_\gamma$, so that the influence of the stability of the coefficient is great.

$K_{\gamma_0}$ is the auto-correlation coefficient of the 0-th order, and represents the power spectrum of the output waveform of the inverse filter. Therefore, when the linear prediction coefficient $K_\alpha$ obtained is unstable, it assumes a negative value which is physically impossible. Even in this case, a very stable coefficient $K_\alpha$ is obtained by performing the processing stated above, with the result that a very excellent recognition is achieved. With the above method of estimation which utilizes the prediction error correlation of the output waveform (prediction error wave) having undergone the inverse spectrum parameter, the degree of coincidence of the whole spectrum is assessed. This is more stable than the assessment based on the synthesis of the degrees of agreement of the partial auto-correlation coefficients as in the example of FIG. 7. The reason therefor is that the influence of an operating precision for evaluating the partial auto-correlation coefficients, etc. appear in the individual coefficients, so that although the error on the whole is small, errors in the individual coefficients can develop to be large in some cases.

In the case of realizing the foregoing processing with the device of FIG. 8, the speech waveforms stored in the random access memory 30 are sequentially taken out every frame, and they are forwarded to the arithmetic unit 32 through the data bus 31. Upon receipt of an instruction from the controller 33, the arithmetic unit 32 executes the following operations together with the multiplier 34. First, in conformity with Equation (4), the auto-correlation coefficient $K_\rho$ is evaluated. By utlizing this coefficient, the linear prediction coefficient $K_\alpha$ is evaluated according to Equation (2). Subsequently, by utilizing the linear prediction coefficient $K_\alpha$, the inverse spectrum parameter $K_A$ is calculated according to Equation (3). From the calculated parameter, the auto-correlation coefficient $K_\gamma$ of the speech waveform having been passed through the inverse filter is evaluated according to Equation (5). Further, the standard parameters $K'A$ and $K'\gamma$ stored in the standard parameter memory 36 are sequentially read out. Using them and the values $K_A$ and $K_\gamma$ evaluated as stated above, the similarity d is evaluated according to Equation (6). Depending upon the magnitude of the similarity, the speech recognition processing is executed.

The effects of the embodiment of this invention as described herein will be provided in relation to an example of the speaker identification directed to telephone speeches.

In this example, the assessment was made by the use of speeches which had been transmitted via toll circuits from two different toll exchanges and recorded in a third place. In the case where speakers were recognized with the characteristic parameters of the partial autocorrelation coefficients by employing the recognizing unit shown in FIG. 7, the speaker identification percentage (the percentage of correct answers at the time when decision is made on the basis of a decision threshold value which is stipulated so that the proportion at which the speech of a particular person is regarded as another's and rejected erroneously may become equal to the proportion at which another's speech is erroneously regarded as the particular person's and accepted) was about 65% according to the prior-art method of recognition in the system of FIG. 1; whereas, it was improved to 78% according to the recognition method of this invention as provided by the system illustrated in FIG. 3.

In the case where the prediction error correlation was utilized for identification by employing the recognizing unit in FIG. 8, the speaker identification percentage was about 75% with the prior-art recognition system of FIG. 1, whereas an identification percentage of about 90% was attained by the recognition of this invention as provided by the system of FIG. 3. In consideration of the fact that the identification percentage in the speaker identification is essentially and basically different from that of the phonetic recognition, that the value of 100% is never guaranteed and that the percentage is about 95% even under the ideal condition free from noise and circuit distortions, the aforecited identification percentage of 90% is epoch-making.

The recognizing units for the preprocessed speech waveforms is not restricted to the foregoing examples, but various known recognition means can of course be used.

It is also possible to use a microcomputer or the like instead of the Fourier transformer, the band selection circuit and the inverse Fourier transformer in FIG. 3 and to execute the operations of the devices with a program.

Further, the sampling frequency, the telephone transmission band etc. are not restricted to the values exemplified previously, but they can take arbitrary values.

As set forth above, according to this invention, the stability of the inverse filter can be enhanced, the degradation of speech information inside the transmission band can be prevented, and the influence of noise outside the transmission band can be eliminate, so that the speech recognition can be conducted at a sufficiently high exactitude.

We claim:

1. A preprocessing method for a speech recognition device having input means for receiving a speech signal which has been transmitted through a transmission system having a certain transmission band, preprocessing means including an inverse filter for preprocessing the input speech signal and recognition means for recognizing the input speech signal from said preprocessing means; comprising the first step of Fourier-transforming the speech signal from said input means to obtain a frequency spectrum, the second step of extracting only a frequency spectrum relating to the frequency spectrum of said transmission band from said frequency spectrum obtained at said first step and continuously rearranging the extracted frequency spectrum from 0 Hz, and the third step of subjecting to inverse Fourier transform the signal corresponding to the rearranged frequency spectrum extracted at said second step, the fourth step of analyzing a signal obtained at said third step to obtain a specified characteristic parameter and the fifth step of setting a characteristic inverse to said characteristic parameter obtained by said fourth step in said inverse filter and passing the input speech signal through said inverse filter, thereby obtaining the input speech signal for said recognition means.

2. A preprocessing method for a speech recognition device according to claim 1, comprising a sixth step of converting said speech signal from said input means into a digital signal by employing substantially $2^{n+1}$ (n being a positive integer) times the width of said transmission band of said transmission system as a sampling frequency.

3. A preprocessing method for a speech recognition device according to claim 1, wherein a partial auto-correlation coefficient is used as said characteristic parameter.

4. A preprocessing device for a speech recognition device comprising input means for receiving a speech signal which has been transmitted through a transmission system having a certain transmission band, the first conversion means for subjecting the speech signal from said input means to Fourier transform to obtain a frequency spectrum, extraction means for extracting only a frequency spectrum relating to the frequency spectrum of said transmission band from said frequency spectrum obtained by said first conversion means and for continuously rearranging the extracted frequency spectrum from 0 Hz, second conversion means for subjecting said frequency spectrum extracted by said extraction means to inverse Fourier transform, analysis means for analyzing the output of said second conversion means to obtain a specified characteristic parameter, and an inverse filter in which a characteristic inverse to said characteristic parameter obtained by said analysis means is set and which permits said speech signal from said input means to pass therethrough, thereby to recognize the speech signal having passed through said inverse filter.

5. A preprocessing device for a speech recognition device according to claim 4, wherein said input means includes filter means for subjecting the speech signal from said transmission system to low-pass filtering, and an analog-to-digital converter which samples an output of said filter means and converts it into a digital signal.

6. A preprocessing device for a speech recognition device according to claim 4, wherein said analysis means comprises means for analyzing said output of said second conversion means to evaluate a partial auto-correlation coefficient.

* * * * *